United States Patent Office 3,573,139
Patented Mar. 30, 1971

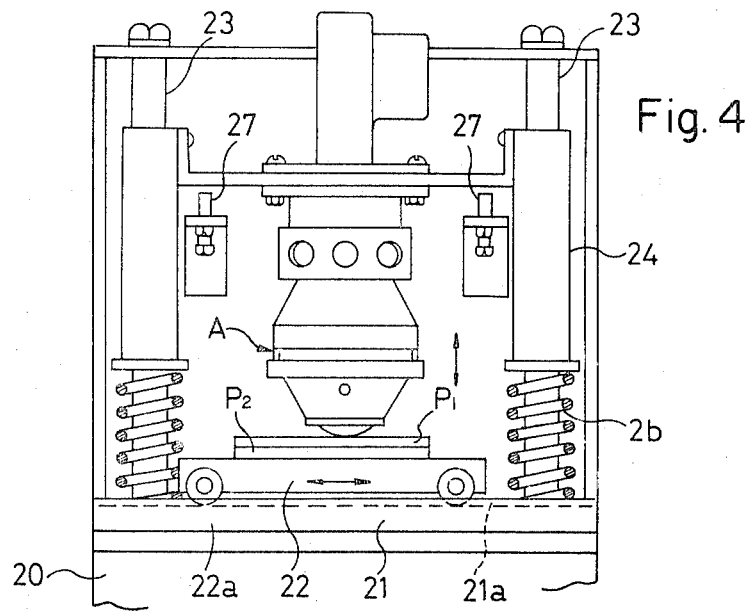
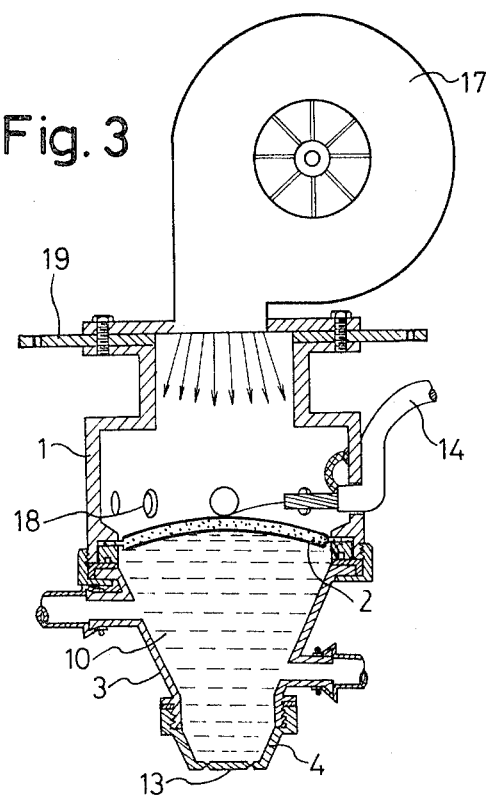

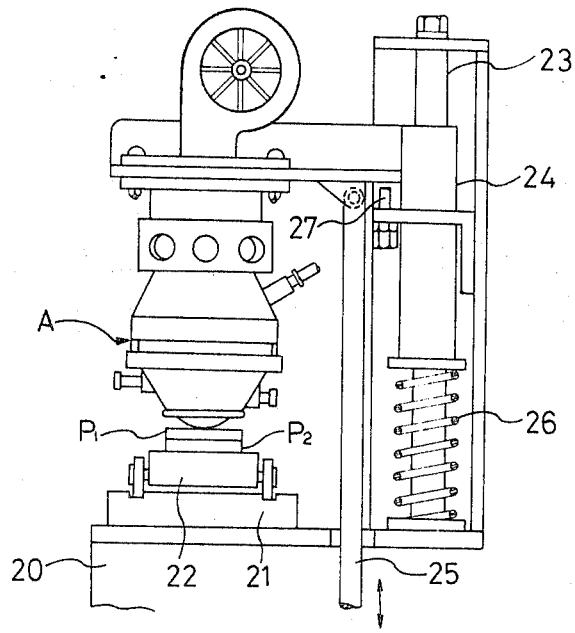
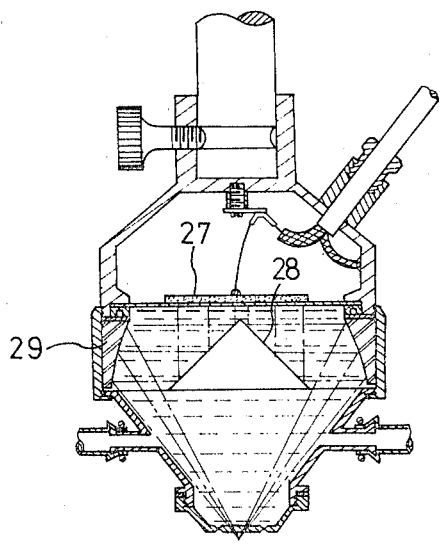
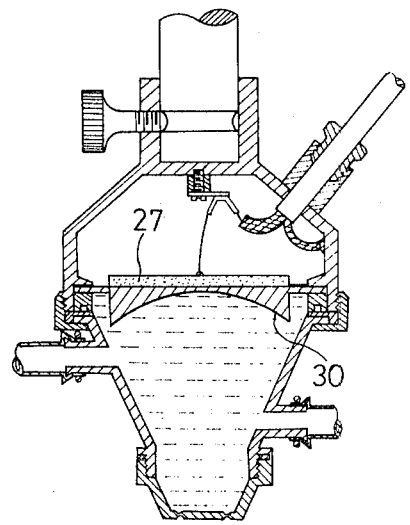

3,573,139
METHOD AND APPARATUS FOR WELDING PLASTIC MEMBERS
Eiji Mori, 10–35, 2-chome Ohokayama, Meguro-ku; Masao Ide, 15–18, 1-chome Ishikawa-machi, Ohta-ku; and Seiji Kaneko, 187, 1-chome Kamiochiai, Shinjuku-ku, all of Tokyo, Japan
Original application Oct. 13, 1967, Ser. No. 675,109, now Patent No. 3,518,136, dated June 30, 1970. Divided and this application Aug. 4, 1969, Ser. No. 862,118
Int. Cl. B23k *1/06;* B29c *27/08;* B32b *31/20*
U.S. Cl. 156—580      5 Claims

ABSTRACT OF THE DISCLOSURE

Apparatus for welding plastic members with ultrasonic waves comprises a generator for ultrasonic waves of a frequency not lower than 100 kc. s. in a void free volume of liquid medium, and a device for focusing the waves toward a focal zone where the surfaces of the plastic members to be welded are disposed, there being a liquid interface between the surface of at least one of the plastic members and the liquid medium.

---

Figure 1:
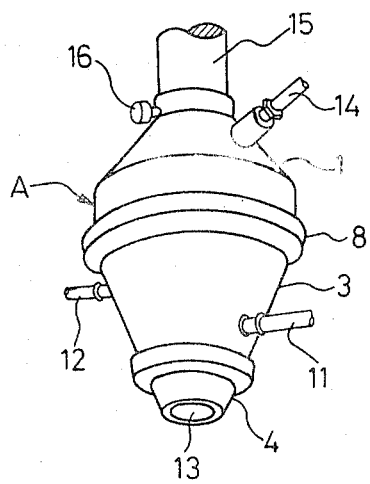

This application is a division of Ser. No. 675,109, filed Oct. 13, 1967, now Pat. No. 3,518,136, issued June 30, 1970.

The invention relates to apparatus for welding plastic members by a focused beam of ultrasonic waves and apparatus for carrying out the method.

The use of ultrasonic wave for welding plastic members has been already known, and most conventionally, ultrasonics having a frequency in the order of 20 kilocycles per second are used to excite a metal vibrating horn which is directly urged under pressure against the surface of a plastic member to be joined with another. However, with such welding technique, it has been impossible to avoid formation of scars or distortion on the surface of the member which contacts the horn, particularly when the members to be worked are of soft plastic materials.

Therefore, it is an object of the invention to provide apparatus for welding plastic members to be joined at the contact surface therebetween by using ultrasonics and without leaving any scar or distortion on the external surface of the members worked.

It is a specific object of the invention to provide means for efficiently transmitting a focussed beam of ultrasonics to the contact surface between plastic members to be welded.

Another object is to provide apparatus whereby ultrasonics can be efficiently transmitted to and absorbed by members to be worked.

Still another object of the invention is to provide apparatus for obtaining uniform welding of members to be joined throughout the area of contact therebetween.

These objects are achieved in accordance with the invention by using ultrasonics of substantially higher frequency than that usually employed in the prior art. Generally, sound velocity in plastic materials ranges from hundreds to thousands meters per second so that a sound wave applied to a plastic material and having a frequency in the range of one hundred kilocycles to ten megacycles per second will have a wavelength in the interior of plastics material which is of the order of millimeters or less, with the consequence that it obtains an appreciable directivity. Thus the invention proposes to focus ultrasonics of a frequency within the above range to the interior or surface of a plastic member so as to produce a sharp focal zone having a high density of acoustic energy, thereby limiting the area where heat is produced to the focal zone.

Ultrasonics used according to the invention should desirably have a high frequency above one hundred kilocycles per second in order to ensure maximum absorption by plastic members to be worked and positive focussing to achieve a sharp focal zone. Suitable vibrators for this purpose can be formed from various known materials capable of being excited to effect resonance at such high frequency; for example, electrostrictive materials such as barium titanate and lead zirconate, or piezoelectric materials such as quartz. Below one hundred kilocycles, there occurs a difficulty of efficiently focussing ultrasonics. The upper limit of the frequency range is principally determined by the availability of vibrator materials and construction requirements for mechanical strength.

In accordance with the invention, liquid is used as a medium for transmitting ultrasonics produced by the vibrator. This overcomes another disadvantage of the prior art when a metal horn is employed as a transmission medium. It was found that the metal horn had complex modes of its vibration to thereby make it difficult to produce an effective focal zone, while substantially no disturbance of focussing was observed with liquid medium. Another advantage provided by the use of liquid medium is that the wavelength of ultrasonics used does not impose restrictions on the dimension of arrangement of the medium as it does in the metal horn. This is because a metal horn has a high acoustic impedance and consequently requires to be used in a configuration which achieves resonance. Furthermore, the liquid medium provides cooling effect to the members to be worked. Although the reason that members worked with the invention have no scars or distortions formed on the external surface thereof may be considered partly due to incomplete focussing of ultrasonics at the surface of the member with the result that excessive concentration of stress does not occur at this place, it is also believed that the cooling effect provided by the liquid medium partly contributes to the achievement of the above result.

Figure 2B:
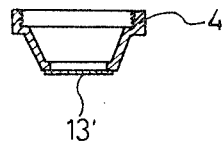
Figure 2A:
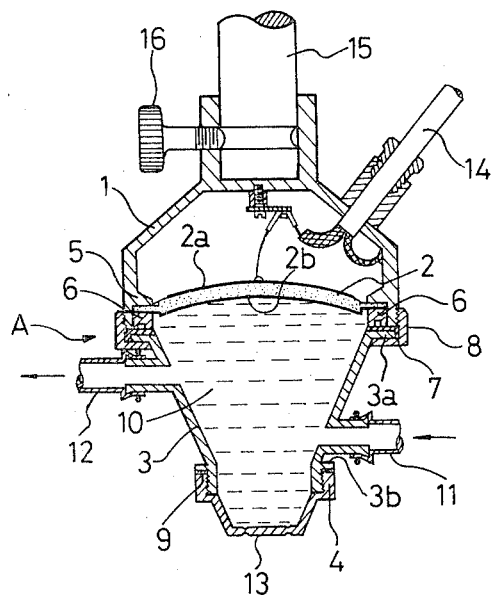

The above and other objects, features and advantages of the invention will become apparent from the following description of several embodiments thereof shown in the drawing wherein:

FIG. 1 is a view showing the exterior of an ultrasonic wave generating and focussing apparatus in accordance with one embodiment of the invention, FIG. 2a is a longitudinal section of the apparatus shown in FIG. 1, FIG. 2b is a fragmentary view of the appparatus illustrating a modification of a part thereof, FIG. 3 is an elevation, partly in longitudinal section, of the apparatus combined with a forced cooling means, the latter being a fan shown schematically, FIG. 4 is a front elevation of a welding system incorporating the ultrasonic wave generating and focussing apparatus of the invention shown in FIG. 3, FIG. 5 is a side elevation of the system shown in FIG. 4.

Figure 8:
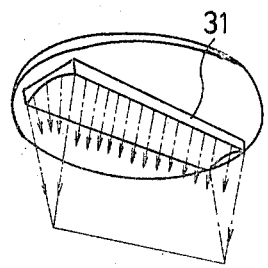
Figure 10A:
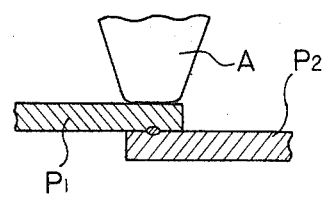
Figure 9:
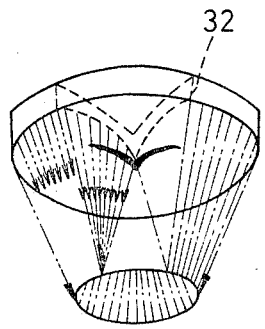
Figure 10B:
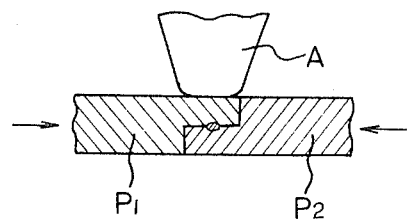
Figure 10C:
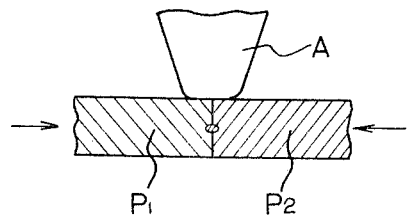
Figure 11:
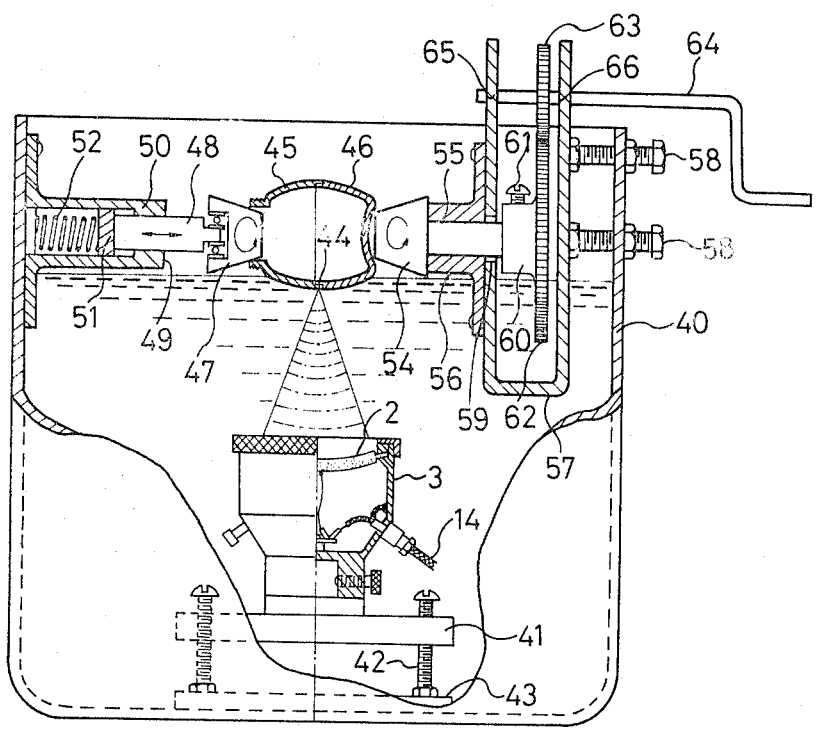
Figure 12:
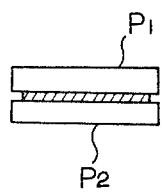

FIGS. 6 to 9 show various forms of focussing ultrasonics, and particularly FIG. 6 shows a reflection type using an optical prism, FIG. 7 a form using a plastics lens, FIG. 8 an arrangement for producing a linear focus, and FIG. 9 another arrangement for producing a circular focus, FIGS. 10a to 10c show various welding positions of plastic members to which the method of the invention can be applied, FIG. 11 shows, partially broken away and in section, another welding system incorporating the apparatus of the invention which may be used to carry out an alternative method of the invention, and FIG. 12 is a view illustrating a further teaching of the invention for improving uniformity of welding.

It should be noted that in the drawing like parts are designated by the same reference characters.

Referring to the drawing, and particularly FIGS. 1 and 2, there is shown one embodiment of an ultrasonic wave generating and focussing apparatus, generally shown at A. The apparatus A comprises a body 1 which supports a vibrator 2 in the form of a part of a sphere. The vibrator 2 has both its upper and lower surfaces coated with conductive materials such as silver or nickel to thereby form electrodes 2a, 2b for the mode of vibration in the direction of thickness. Because of its shape, the vibrator itself acts as focussing means of ultrasonics. The apparatus further comprises a vessel 3 closed at the bottom by a cap member 4. The vessel is filled with liquid medium for transmitting ultrasonics produced by the vibrator 2. The body 1 has an inward, annular flange 5 adjacent its bottom and the peripheral edge of the vibrator 2 is pressed against the flange 5 by a snap ring 6. The vessel 3 is connected at its top to the body in a fluid-tight manner. To this end, the top flange 3a of vessel is held against the bottom of body 1 through a fluid-tight packing 7 by means of a connecting ring 8. The vessel is generally of frusto-conical shape and has a cylindrical bottom portion which is threaded for threadable engagement with the cap member 4. In order to hydraulically and pneumatically seal the vessel so that liquid medium is confined void-free in the space defined by the vibrator 2, the vessel 3 and the cap member 4, an annular fluid-tight packing 9 is placed between the upper end of the threaded portion of the cap member 4 and an external flange 3b provided at the top of the cylindrical portion of the vessel 3.

Liquid medium 10 filled in the vessel 3 should be deaerated liquid such as deaerated water or deaerated oil which does not cause or suppresses cavitation phenomenon upon propagation of ultrasonics therethrough. When filled, liquid medium 10 must be void-free within the vessel 3. Air bubbles may remain on the inner wall of the vibrator or the vessel, and in order to remove such air bubbles, the liquid may be filled to overflow so that bubbles are carried away by forced flow of liquid. Water may be boiled, subjected to evacuation or shaking before being filled in the vessel 3. Liquid medium thus processed must be sealed from contact with the atmosphere or other gas for a prolonged time.

Additionally, it should have an acoustic impedance approaching that of plastic members to be worked. Liquid medium is supplied to the vessel 3 through an inlet port 11 and displaced therefrom through an outlet port 12, these ports 11, 12 being usually closed by suitable valves not shown. The cap member 4 has its bottom formed by a thin metal plate 13 which is soldered to the lower end of the frustoconical wall of the cap member 4. The purpose of this bottom plate is to transmit ultrasonics which are propagated through liquid medium 10 to an underlying plastic member to be worked. Therefore, minimum transmission loss of ultrasonics and proper mechanical strength to withstand shocks exerted by the ultrasonics are two fundamental requirements for the bottom plate. Film or cloth made from organic materials is unsatisfactory, because they are liable to be fractured when subject to ultrasonics. For this reason, a thin metal plate is chosen previously, electric power for excitation of the vibrator 2 is provided through a high frequency cable 14 connected to a suitable voltage source not shown, one lead of the cable being connected to the electrode 2a and the other to the body 1 which is connected mechanically and electrically with the electrode 2b of the vibrator 2, the latter being thus grounded. The body 1 has a cylindrical part at the top for connection with a mounting stub 15 and is secured thereto by suitable means such as set screw 16.

In the embodiment shown in FIG. 3, the ultrasonic wave generating and focussing apparatus is generally similar to that shown in FIG. 2, but has a blower 17 associated therewith for forced cooling of the spherical vibrator 2. It will be noted that in this instance, the body 1 has holes 18 formed therein for exhaust of air flow. Also the apparatus is shown to be secured to a mounting plate 19 in place of the mounting stub 15 shown in FIG. 2a.

Now with reference to FIGS. 4 and 5, an operation for welding two flat, plastic plates at the surface of face-to-face contact by using a welding system constructed in accordance with the invention will be described. The system incorporates the apparatus shown in FIG. 3 which is also designated in FIGS. 4 and 5 by reference character A. The system further includes a cradle for members to be worked and a support assembly for the apparatus.

Specifically, there is provided a base 20 on which is mounted a stool 21 having a pair of guide grooves 21a formed in the upper surface thereof. A table 22 is placed on the stool 21 with its carrying rollers 22a engaging the grooves 21a, so that the table 22 provides a slidable cradle for members to be worked. Vertically mounted on the base 20 and spaced apart are a pair of posts 23 to which is secured a framework 24 which in turn carries the appartus A in opposing relationship with respect to the cradle 22. The framework 24 loosely fits around the posts 24 and can be raised or lowered by the vertical movement of an operating rod 25 connected thereto. Between the framework 24 and the stool 21, springs 26 are wound around the posts 23. A pair of steps 27 are arranged so that minimum clearance can be maintained between the lower end of the apparatus A and the cradle.

In operation, plastic plates $P_1$ and $P_2$ to be joined are placed one on another on the cradle 22. The ultrasonic wave generating and focussing apparatus A is adjusted so that when its lower end or the thin metal plate 13 at the bottom of the cap member 4 is brought into contact with the upper surface of the upper member $P_1$, the beam of ultrasonic wave is focused to a location of welding, that is, to the surface of contact between the members $P_1$ and $P_2$. This adjustment can be made by varying the length of path of transmission of the wave within the liquid medium or by suitable replacement of one cap member by another having a different vertical height. The pressure acting between the thin metal plate 13 and the upper plastic member $P_1$ can be chosen quite small. In an example, titanium plate 50 microns in thickness and 10 mm. in radius was brought into contact with polyethylene sheet 3 mm. in thickness with a total pressure of 300 grams. It should be noted that this is quite a small value as compared with the pressure employed in the prior art for a metal horn.

transmitted by the thin metal plate, absorbed by the plastic plate $P_1$ and forms a focal zone in the surface of contact between the plastic plates $P_1$ and $P_2$, thereby heating and welding together the plates at this surface. Thus by sliding the cradle 22, a continuous weld line is obtained along the surface of contact.

An example is given below which shows values used or achieved in welding two polyethylene films in the manner just described above.

Vibrator: Barium titanate vibrator having the shape of a sphere of 65 mm. in radius cut to a fraction of 50 mm. in diameter
Frequency: 3 mc./s.
High frequency excitation power: 20 watts
Focal zone: 1.5–2.0 mm. in diameter
Peak energy density in focal zone: 10–15 w./mm.$^2$
Thickness of films: 3 mm.
Feed rate of films: 1 m./min.

In the above description, flat plastic plates have been welded at the surface of face-to-face contact, as illustrated in FIG. 10a. However, the above mentioned ultrasonic wave generating and focussing apparatus A is equally applicable for welding plastic members having interengaging stepped ends at such joint (FIG. 10b) or for welding those in end-to-end abutment (FIG. 10c). In these cases, the apparatus is positioned as indicated in these figures. It may be desirable to apply an external force, as indicated by arrows, to keep both members in steady engagement or abutment.

In the apparatus shown in FIGS. 2 and 3, the vibrator had the shape of a part of a sphere for the purpose of focussing ultrasonics. However, the focussing can be achieved in various other ways. FIG. 6 shows one of such alternative ways. In this figure, a planar or flat vibrator 27 is used and the ultrasonics produced are reflected by a conical reflector or prism 28 which deflects the waves by 90° laterally to a surrounding mirror 29 having the shape of a part of paraboloid. The paraboloid mirror 29 is designed to focus the waves to a focal zone below the thin metal plate as shown. In FIG. 7, a plannar vibrator 27 is combined with a plano-concave plastic lens. All of these focussing arrangements are examples which may be used to obtain a point focus. FIGS. 8 and 9 illustrates further arrangements for creating a linear or circular focus. The lens 31 shown in FIG. 8 is plano-concave in shape for use with an elongated planar vibrator to produce a linear focus. The lens 32 shown in FIG. 9 may be considered as formed by rounding the lens 31 of FIG. 8 in a circle of a radius which is equal to the width of the lens 31 with its one side constituting the periphery of the circle and its other side an apex at the center of the circle, as will be noted from the section indicated in broken lines in FIG. 9. It will be appreciated that other numerous variations of focussing means may be considered within the skill of one having ordinary knowledge in the art of geometrical optics.

Referring to FIG. 11, there is shown another embodiment of the welding system according to the invention. The system includes a casing 40 in which an ultrasonic wave generating and focussing apparatus as illustrated in FIG. 2a is supported in an inverted position on a plate 41 adjustably carried by bolts 42, the latter being engaged with threaded holes in a base portion 43 of the casing. It will be noted that the vibrator 2 of the focussing apparatus is concave in an upward direction and wave fronts of ultrasonics produced which would be concentric spheres are shown in chain lines converging to a focal zone 44 which in this case is a stepped junction between ends of two hollow cylindrical, plastic bodies 45 and 46. It should be noted that in this embodiment, the bodies 45 and 46 are partly immersed in liquid medium 10 contained void-free in the casing so that the junction 44 lies below the level of the liquid medium. The opening at the lefthand end of the plastic body 45 is engaged by a frusto-conical support 47 which is journalled by a rod 48 at a bearing 48a. The rod 48 slidably extends through an opening 49 provided in one end of a cylinder 50 which is laterally secured to the wall of the casing, and is connected at its other end with a piston 51. A compression spring 52 extends between the piston 51 and the casing wall.

The other plastic body 46 is engaged by another frusto-conical support 54 connected with a driving shaft 55 which is supported by and extends through a sleeve 56. The sleeve 56 is secured as by bolts to a U-shaped member 57 which is fixed to the casing wall by bolts 58. The shaft 55 extends through an opening 59 formed in the U-shaped member and is fixedly connected with a hub 60 by a set screw 61, the hub 60 being integral with a transmission gear 62 which meshes with a gear 63 mounted on an axle 64 rotatably supported by the U-shaped member 57 at 65 and 66. The free end of the axle 64 is bent in the form of a crank as shown and provides a handle for rotating the axle 64 and the gears 63 and 62 therewith.

In operation, plastic bodies 45 and 46 are mounted in place between the supports 47 and 54 with the stepped junction 44 lying at the focal zone of the focussing apparatus, whereby sufficient pressure is applied by the piston and cylinder assembly 49, 50 including the compression spring 52 to hold both plastic bodies 45 and 46 in steady engagement. Then the ultrasonic vibrator 2 is excited through the cable 14, whereupon the junction 44 is melted and joined together. Operation of the handle at the free end of the axle 64, either manually or automatically as programmed, rotates the support 54 as shown by an arrow, so that a circular weld line is formed along the junction 44. It will be readily understood that various other forms of weld lines can be obtained as desired by suitable design of parts which provide movement to the bodies to be worked. It will be noted that with this arrangement, the plastic bodies to be worked are directly in contact with liquid medium at their part which serves to transmit ultrasonics to the focal zone in the interior of the bodies, so that a cooling effect is achieved advantageously by the liquid medium. It is believed that this together with insufficient focussing at the body surface explains why surface scars are not formed with the apparatus of the invention.

According to the invention, further advantage is provided by applying a layer or film of liquid between the surfaces of parts to be joined as shown in FIG. 12. Such liquid may be water, alcohol, oils or any other liquid which prove satisfactory as a transmission medium of ultrasonics. Also paste-like materials may be used for this purpose, provided their consistency is such that they well fill in the space between the surfaces to be joined. Perferrably such liquid layer or film should not contain air bubbles or foams of any other gas, since the latter spoils the very purpose of providing the film or layer which is to achieve a uniform transmission medium between surfaces to be joined to thereby minimize reflection and transmission loss of ultrasonics. Microscopic examination showed that when a pair of plastic plates were joined at the surface of face-to-face contact, fusion of material dominantly prevailed in one plate, that is the one through which the ultrasonic wave was transmitted. Whena liquid layer was applied between the two plates, fusion of material was observed progressing to the same degree in both plates. A surface of a plastic plate has considerable unevenness when viewed microscopically and where two plates are brought into face-to-face contact, the contact will not be uniform along its length, so that it is considered that the above liquid layer or film applied between surfaces to be joined serves to eliminate such irregularities, thereby achieving a uniform welding.

While the invention has been described and illustrated with reference to particular embodiments, it should be apparent to those skilled in the art that various modifications are possible within the scope of the invention that is solely limited by the appended claims.

What is claimed is:

1. Apparatus for welding plastic members with ultrasonics, comprising an ultrasonic vibrator capable of producing an ultrasonic wave of frequency not lower than 100 kc./s., a vessel containing void-free liquid medium adapted to transmit the wave therethrough and mounted for coupling said liquid medium with the vibrator, means for focussing the wave which propagates through said liquid medium to a predetermined focal zone, and a liquid layer in contact with the surface of one of the plastic members through which the wave is propagated.

2. Apparatus according to claim 1, wherein said vessel is closed by a cap member including a thin metal plate which lies in the path of transmission of the wave and said liquid layer is applied between the thin metal plate and said surface.

3. Apparatus according to claim 1, wherein the vibrator and the surfaces to be joined of the plastic members are immersed in said liquid medium, whereby the wave which propagates through said liquid medium in directly applied to the surfaces to be joined.

4. Apparatus according to claim 3, further including means for imparting translational and rotational movements to the plastic members, whereby during application of the ultrasonic wave the plastic members are continuously moved to obtain a circular, helical or spiral weld line.

5. In the apparatus for welding two plastic members with ultrasonics, comprising in combination an ultrasonic vibrator capable of producing an ultrasonic wave of frequency not lower than 100 kc./s., a vessel containing void-free liquid medium adapted to transmit the wave therethrough and mounted for acoustically coupling said liquid medium with the vibrator, and means for focussing the wave which propagates through said liquid medium to a predetermined focal zone, the improvement which comprises a liquid layer applied between the surfaces to be joined of the two plastic members placed in said focal zone.

References Cited
UNITED STATES PATENTS 2,846,563   8/1958   Cronin _____ 228—1UX BENJAMIN A. BORCHELT, Primary Examiner J. J. DEVITT, Assistant Examiner U.S. Cl. X.R.

156—73; 228—1